(12) United States Patent
Laine

(10) Patent No.: US 8,720,184 B2
(45) Date of Patent: May 13, 2014

(54) METHOD AND DEVICE FOR SUPPLYING A SPACE PROPULSION ENGINE WITH LIQUID CRYOGENIC PROPELLANTS

(75) Inventor: Robert Andre Laine, Paris (FR)

(73) Assignee: Astrium SAS, Paris (FR)

(*) Notice: Subject to any disclaimer, the term of this patent is extended or adjusted under 35 U.S.C. 154(b) by 1238 days.

(21) Appl. No.: 12/597,052

(22) PCT Filed: Apr. 14, 2008

(86) PCT No.: PCT/FR2008/000517
§ 371 (c)(1),
(2), (4) Date: Oct. 22, 2009

(87) PCT Pub. No.: WO2008/142290
PCT Pub. Date: Nov. 27, 2008

(65) Prior Publication Data
US 2010/0115917 A1 May 13, 2010

(30) Foreign Application Priority Data
Apr. 25, 2007 (FR) .................................. 07 02996

(51) Int. Cl.
*F16L 37/56* (2006.01)
(52) U.S. Cl.
USPC .............................. 60/258; 60/257; 137/594
(58) Field of Classification Search
USPC ............ 60/258, 257, 240, 259; 137/594, 595, 137/597
See application file for complete search history.

(56) References Cited

U.S. PATENT DOCUMENTS

| 2,810,259 | A | * | 10/1957 | Burdett, Jr. | ..................... 60/258 |
| 2,810,529 | A |   | 10/1957 | Burdett |  |
| 2,995,008 | A |   | 8/1961  | Fox |  |
| 3,013,388 | A | * | 12/1961 | Loughran | .................. 60/39.462 |
| 2,323,049 | A |   | 2/1966  | Rhodes |  |
| 4,707,983 | A | * | 11/1987 | Gillon, Jr. | ....................... 60/258 |
| 4,722,185 | A |   | 2/1988  | Campbell |  |
| 4,726,184 | A |   | 2/1988  | Russell |  |
| 4,901,525 | A | * | 2/1990  | Beveridge et al. | ............... 60/211 |
| 5,941,062 | A |   | 8/1999  | Koppel |  |
| 2002/0056762 | A1 | | 5/2002 | Kretschmer |  |

OTHER PUBLICATIONS

International Search Report dated Jan. 5, 2009 w/ English translation.
Written Opinion of the International Searching Authority with English translation.

* cited by examiner

*Primary Examiner* — Phutthiwat Wongwian
*Assistant Examiner* — Vikansha Dwivedi
(74) *Attorney, Agent, or Firm* — Dickinson Wright PLLC

(57) ABSTRACT

Disclosed are a method and device for supplying a combustion chamber of a space propulsion engine with cryogenic liquid fuel and oxidizer propellants. The propellants are mixed at constant pressure to produce a propellant mixture, with the propellants being mixed at a location upstream of an orifice of a propellant injector. The propellant mixture is fed to an enclosure of the propellant injector, and from the propellant injector enclosure, the propellant mixture is injected into the combustion chamber. The flow rate of the propellant mixture from the propellant injector enclosure into the combustion chamber is varied by adjustment of the propellant injector, with the injection of the propellant mixture from the propellant injector enclosure into the combustion chamber being at constant pressure.

9 Claims, 2 Drawing Sheets

METHOD AND DEVICE FOR SUPPLYING A SPACE PROPULSION ENGINE WITH LIQUID CRYOGENIC PROPELLANTS

FIELD OF THE INVENTION

The present invention relates to space propulsion engines supplied with cryogenic liquid propellants.

BACKGROUND OF THE INVENTION

In known engines of this type, for example LOX-LH2 or LOX-kerosene engines currently used in launchers, the oxidizer propellant and fuel propellant are injected separately into the combustion chamber of said engines, the mixing of said propellants taking place in said combustion chamber.

Owing to the fact that, in these known engines, it is difficult to cause relatively large pressure variations in the propellant feeds without modifying the ratio of the propellants in the mixture thereof, the possible adjustment in thrust caused by such variations in feed pressure is relatively small. In practice, it is barely possible to obtain a thrust adjustment of around 10 to 20%.

SUMMARY OF THE INVENTION

The object of the present invention is to remedy this drawback.

For this purpose, according to the invention, the method for supplying the combustion chamber of a space propulsion engine with cryogenic liquid propellants by injection means contained in an enclosure, is noteworthy in that:
the fuel propellant and the oxidizer propellant are mixed at constant pressure upstream of said enclosure so as to form a mixture;
said mixture is fed into said enclosure via an orifice in the latter; and
in order to inject said propellant mixture at constant pressure from said enclosure into said combustion chamber, injection means are chosen that enable the flow rate of said injected mixture to be varied.

Thus, thanks to the present invention, the thrust of the engine can be substantially varied by varying the flow rate of the injected mixture, without changing the feed pressure of said propellant injection means. Since the mixing takes place before injection, the fuel propellant/oxidizer propellant ratio remains constant in the injected mixture irrespective of the pressure drop of the mixture through said injection means and irrespective of the flow rate of the mixture injected by said means. Of course, as will be seen later, the variable geometry of said injection means is designed so as to ensure a pressure drop of the mixture sufficient to maintain, over a wide flow rate range, good combustion stability of said mixture in said combustion chamber.

Advantageously, the propellants are chosen to have similar liquefaction temperatures and pressures. For example, the fuel propellant may be liquid methane, while the oxidizer propellant may be liquid oxygen.

For safety, upon operating said engine, the propellant mixture is ignited inside said combustion chamber only after said mixture has reached a supersonic velocity upon exiting the injection means.

To implement the method according to the present invention, it is possible to use a device which comprises a fuel propellant tank, an oxidizer propellant tank and means for pressurizing said tanks to a constant pressure, and in which:

means for mixing said fuel propellant with said oxidizer propellant at constant pressure are provided upstream of said enclosure;
communication means connect said mixing means to an orifice in said enclosure; and
said injection means are capable of varying the flow rate of said mixture injected at constant pressure.

Said injection means may include a plurality of needles, each of them cooperating with a calibrated orifice. Said plurality of needles may be supported by a first plate and the corresponding plurality of calibrated orifices may be made in a second plate, means being provided for imparting a relative movement between said first and second plates whereby the distance therebetween is decreased or increased.

Advantageously, especially if the propellants have similar liquefaction temperatures and pressures, said means for pressurizing the two propellant tanks at constant pressure are common thereto.

In the usual case in which said engine includes a cooling circuit around said combustion chamber, it is advantageous for said mixture to be fed into said enclosure via said cooling circuit.

Mixing means ensure that the two propellants are mixed turbulently. Said means may be external to said engine and, in this case, it is advantageous for them to be thermally coupled to a heat source, for example the combustion chamber, making it possible to ensure that the temperature of the mixture is such that, at the feed pressure of the injection means, neither of said propellants passes into the solid phase upon exiting said mixing means. Thus, according to a preferred embodiment, said cooling circuit around the combustion chamber itself forms said mixing means.

Optionally, a pump may be provided for increasing the feed pressure of the propellant injection means, on condition that the propellant mixture remains at a temperature guaranteeing that there can be no solid phase in the pipes.

BRIEF DESCRIPTION OF THE DRAWINGS

The figures of the appended drawing will make it clearly understood how the invention can be realized. In these figures, identical references denote similar components.

FIGS. 1 and 2 show, schematically and partially, a space propulsion engine by its combustion chamber 1, which chamber is provided with propellant injection means 2 and with a gas discharge nozzle 3 and is cooled by a peripheral cooling circuit 4.

DETAILED DESCRIPTION OF THE INVENTION

Figure 1:
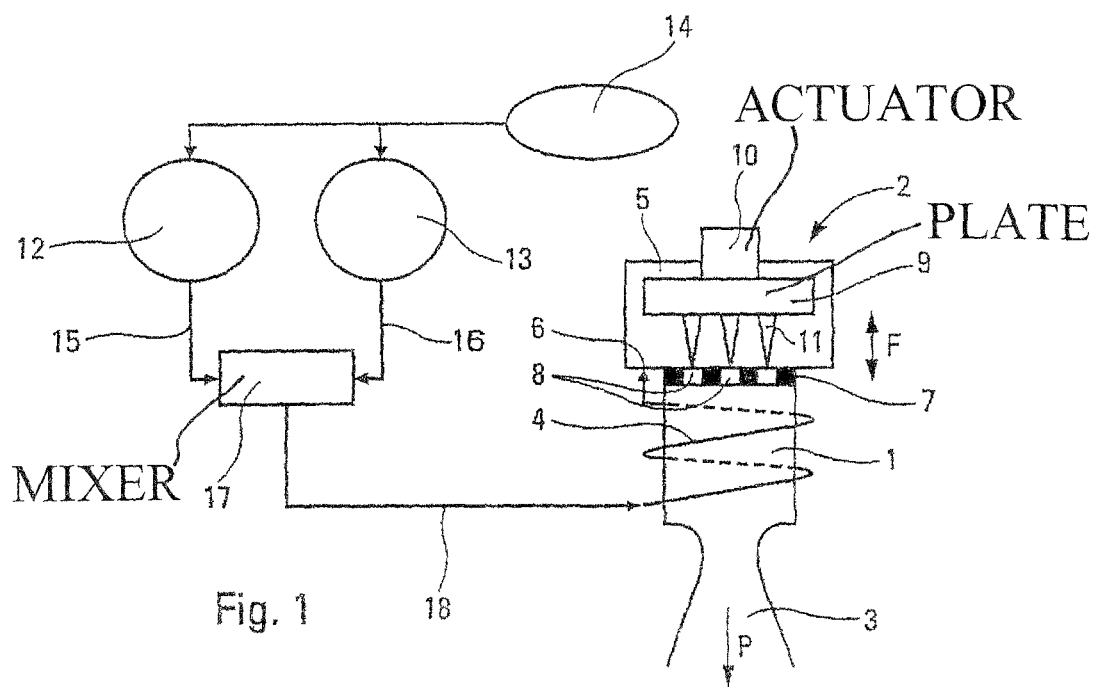
FIG. 1 is a schematic partial view of a space propulsion engine and the device for supplying it with cryogenic liquid propellants, enabling the present invention to be illustrated.

The propellant injection means 2 comprise an enclosure 5 into which said peripheral cooling circuit 4 runs at 6. The enclosure 5 communicates with the combustion chamber 1 via a plate 7 provided with a plurality of calibrated through-orifices 8, for example distributed in concentric circles or in rows and columns (see also FIG. 3). In addition, the enclosure 5 contains a plate 9 at least approximately parallel to the plate 7 and able to be moved closer to and further away from said plate 7 (as indicated symbolically by the double-headed arrow F) thanks to an actuator 10, for example an actuating cylinder. The plate 9 has, on its face turned toward the plate 7, a plurality of needles 11 placed in correspondence with said calibrated orifices 8, so that each needle 11 can cooperate with a calibrated orifice 8 in order to define the flow area of said orifice. Of course, this flow area can be varied, under the control of the actuator 10.

Figure 2:
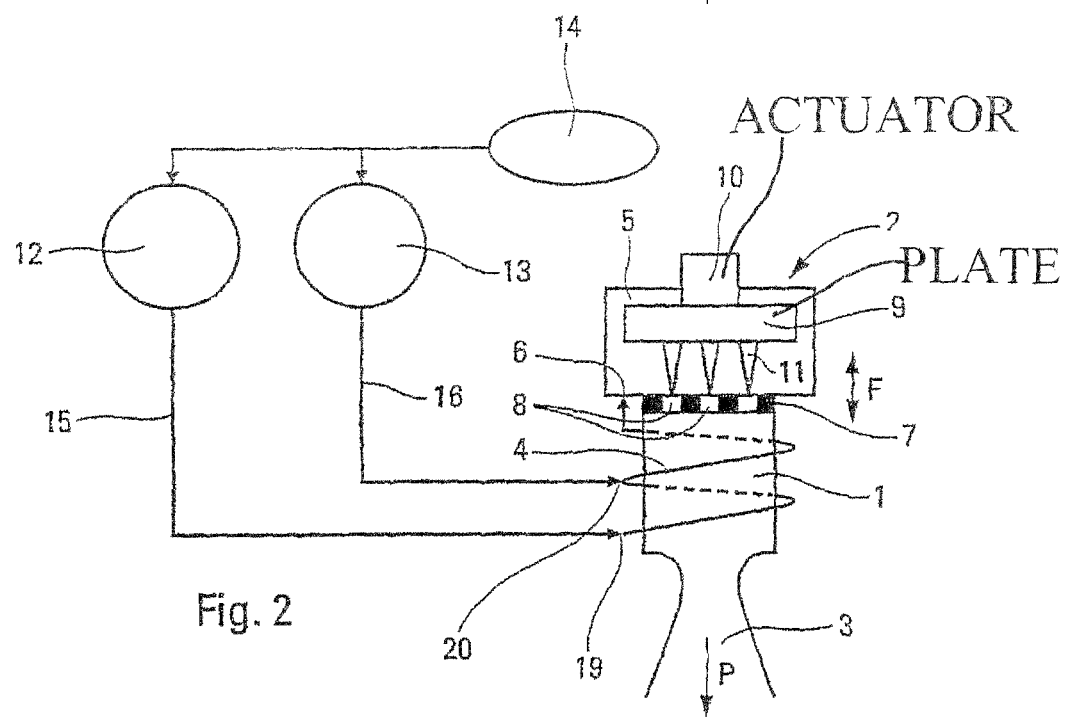
FIG. 2 illustrates, in a view similar to FIG. 1, one embodiment of the propellant mixing means.

In addition, FIGS. 1 and 2 show an oxidizer (for example liquid oxygen) propellant tank 12, a fuel (for example liquid methane) propellant tank 13 and a tank 14 containing an inert gas for pressurizing, in common and at constant pressure, said oxidizer propellant and said fuel propellant.

In the system shown in FIG. 1, the outlet lines 15 and 16 leaving the tanks 12 and 13 are joined to a mixer 17 external to the engine 1, 2, 3 and capable of forming the mixture of said propellants and of sending said mixture to the cooling circuit 4 via its outlet line 18.

The system shown in FIG. 2 does not include a mixer 17. Instead, the outlet lines 15 and 16 leaving the tanks 12 and 13 are individually connected to the cooling circuit 4 via calibrated orifices, 19 and 20 respectively. In this case, the mixing of the propellants therefore takes place in the cooling circuit 4.

In both cases, after the combustion chamber 1 has been cooled, the propellant mixture penetrates the enclosure 5 at constant pressure and is injected with a variable flow rate into said combustion chamber 1 by the injection means 7 to 11.

Figure 3:
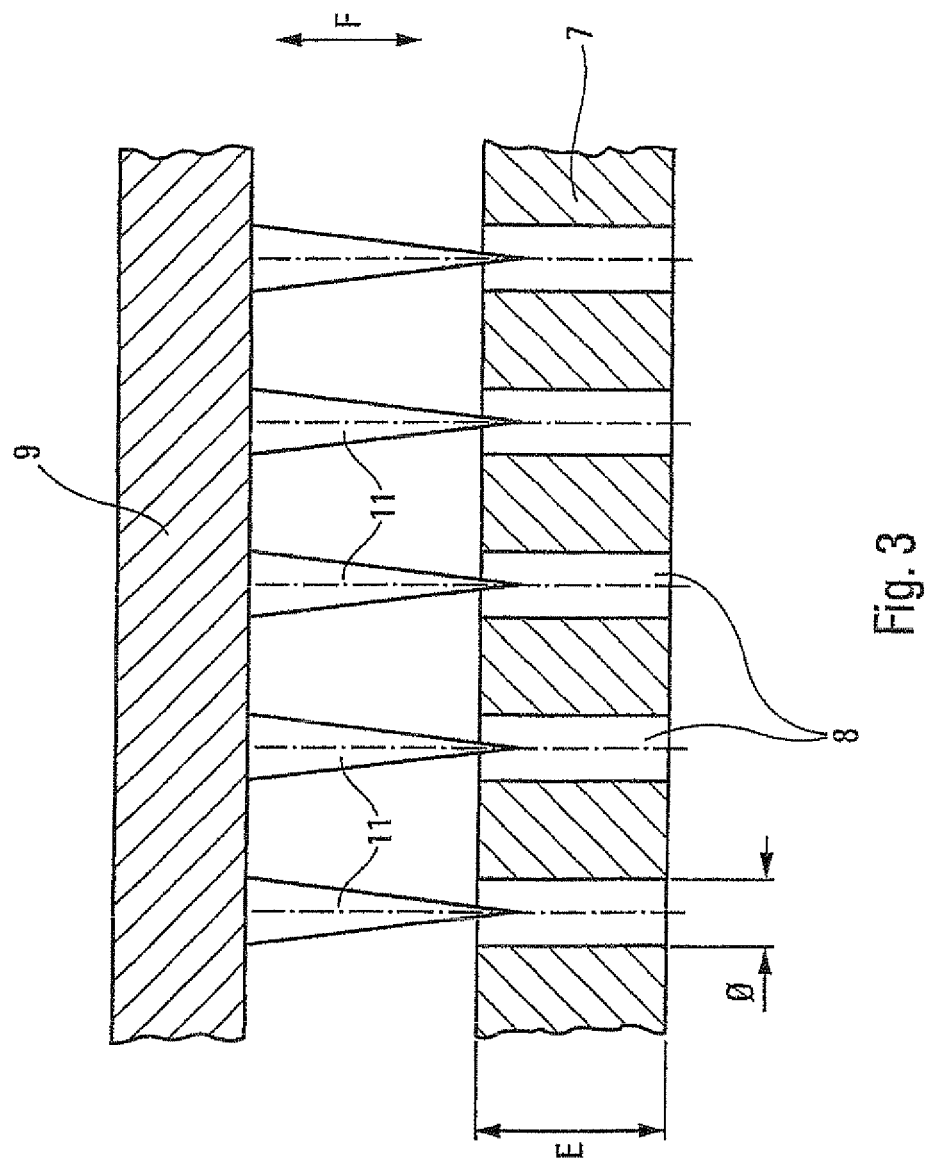
FIG. 3 is a schematic partial view of the means for injecting the propellant mixture, in accordance with the present invention.

In light of the above explanations with regard to FIGS. 1 to 3, it would be readily understood that the thrust P of the engine according to the present invention can be regulated by adjusting the flow rate of the propellant mixture by the injection means 7 to 11, the pressure at which said means are fed with said mixture remaining constant.

To initiate the combustion of the propellant mixture in the chamber 2 (although the velocity of said mixture at the injection means is supersonic), an igniter (not shown) is provided, for example at the center or on the periphery of the plate 7.

Moreover, to spray the mixture and ensure stability of the combustion at full power, each calibrated hole 8 in the plate 7 has a sufficiently high length E/diameter ratio.

The invention claimed is:

1. A method for supplying a combustion chamber of a space propulsion engine with cryogenic liquid fuel and oxidizer propellants, the method comprising: pressurizing a fuel propellant tank and an oxidizer tank at a constant pressure;
   mixing the fuel propellant from the fuel propellant tank and the oxidizer propellant from the oxidizer tank to form a propellant mixture;
   feeding said propellant mixture through via an orifice of an enclosure of a propellant injector, wherein the fuel propellant and oxidizer propellant are mixed at constant pressure upstream of the propellant injector enclosure; and
   injecting said propellant mixture from said propellant injector enclosure into said combustion chamber, wherein flow rate of the propellant mixture into the combustion chamber is varied by varying geometry of the propellant injector, and the injection of the propellant mixture from the propellant injector enclosure into the combustion chamber is at constant pressure.

2. The method as claimed in claim 1, wherein the fuel propellant is liquid methane and the oxidizer propellant is liquid oxygen.

3. The method as claimed in one of claims 1, wherein said propellant mixture is ignited inside the combustion chamber and said propellant mixture is injected into the combustion chamber at supersonic velocity.

4. A device for supplying cryogenic liquid fuel and oxidizer propellants to a combustion chamber of a space propulsion engine, said device comprising:
   a fuel propellant tank;
   an oxidizer propellant tank;
   a pressurizing unit configured to pressurize the fuel propellant tank and oxidizer propellant tank to a constant pressure;
   a mixer configured for mixing said fuel propellant from said fuel propellant tank with said oxidizer propellant from said oxidizer propellant tank at constant pressure and produce a propellant mixture; and
   a propellant injector comprising an enclosure,
   wherein:
   said propellant injector enclosure includes an inlet orifice in fluid communication with said mixer, and
   said propellant injector is configured for varying flow rate of said propellant mixture from said propellant injector enclosure into said combustion chamber at constant pressure.

5. The device as claimed in claim 4, wherein said propellant injector further comprises a plurality of needles, each needle cooperating with a calibrated orifice.

6. The device as claimed in claim 5, wherein the plurality of needles are supported by a first plate, the plurality of calibrated orifices are in a second plate and the propellant injector is configured for imparting relative movement between said first plate and second plate to decrease or increase distance between the first plate and second plate.

7. The device as claimed in claim 4, further comprising a cooling circuit around said combustion chamber, wherein said cooling circuit is configured as the mixer for mixing said fuel propellant and said oxidizer propellant at constant pressure to produce the propellant mixture, and said cooling circuit is configured for feeding said propellant mixture into said propellant injector enclosure.

8. The device as claimed in claim 4, wherein a cooling circuit forms said mixer.

9. The device as claimed in one of claims 4, wherein said mixer is external to said engine.

* * * * *